(12) United States Patent
Warrier

(10) Patent No.: US 10,394,805 B2
(45) Date of Patent: Aug. 27, 2019

(54) DATABASE MANAGEMENT FOR MOBILE DEVICES

(71) Applicant: SAP SE, Walldorf (DE)

(72) Inventor: Srinath Warrier, Thane (IN)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 15/195,871

(22) Filed: Jun. 28, 2016

(65) Prior Publication Data

US 2017/0371922 A1    Dec. 28, 2017

(51) Int. Cl.
| | |
|---|---|
| *G06F 16/00* | (2019.01) |
| *G06F 16/245* | (2019.01) |
| *H04W 12/08* | (2009.01) |
| *G06F 16/2455* | (2019.01) |
| *G06F 16/51* | (2019.01) |
| *G06F 16/903* | (2019.01) |
| *G06F 16/2453* | (2019.01) |
| *G06F 16/9535* | (2019.01) |
| *G06F 16/901* | (2019.01) |
| *G06F 16/9032* | (2019.01) |
| *G06F 16/27* | (2019.01) |
| *G06F 16/22* | (2019.01) |
| *G06F 16/25* | (2019.01) |

(52) U.S. Cl.
CPC ............ *G06F 16/245* (2019.01); *G06F 16/22* (2019.01); *G06F 16/2456* (2019.01); *G06F 16/24544* (2019.01); *G06F 16/25* (2019.01); *G06F 16/27* (2019.01); *G06F 16/51* (2019.01); *G06F 16/901* (2019.01); *G06F 16/903* (2019.01); *G06F 16/9032* (2019.01); *G06F 16/9535* (2019.01); *H04W 12/08* (2013.01)

(58) Field of Classification Search
CPC .......... G06F 17/3087; G06F 17/30864; G06F 17/30477; G06F 17/30867; G06F 17/30893; G06F 17/30575; G06F 16/21; G06F 16/9535; G06F 16/176; G06F 16/23; G06F 16/24; G06F 16/24561; G06F 16/245; G06F 16/2456; G06F 16/51; G06F 16/901; G06F 16/903; G06F 16/24544; G06F 16/9032; H04M 3/42059
See application file for complete search history.

(56) References Cited

U.S. PATENT DOCUMENTS

| | | | | |
|---|---|---|---|---|
| 5,918,232 | A * | 6/1999 | Pouschine | G06F 17/30592 |
| 6,374,252 | B1 * | 4/2002 | Althoff | G06F 16/258 |
| 7,194,503 | B2 * | 3/2007 | Shell | H04L 41/0806 |
| | | | | 455/403 |
| 7,366,989 | B2 * | 4/2008 | Naik | H04L 41/082 |
| | | | | 715/736 |
| 7,756,525 | B1 * | 7/2010 | Thomas | G06F 17/3087 |
| | | | | 455/414.3 |

(Continued)

*Primary Examiner* — Srirama Channavajjala
(74) *Attorney, Agent, or Firm* — Mintz Levin Cohn Ferris Glovsky and Popeo, P.C.

(57) ABSTRACT

Storing a subset of a database on a mobile device. The subset of the database stored on the mobile device being based on privilege information associated with the mobile device and/or a user of the mobile device. One of more mobile applications can access the subset of the database stored on the mobile device when the mobile device is offline and unconnected to a database management system associated with the database. A set of queries can be performed on the subset of the database stored on the mobile device.

23 Claims, 8 Drawing Sheets

(56) References Cited

U.S. PATENT DOCUMENTS

| | | | | |
|---|---|---|---|---|
| 8,805,345 B2* | 8/2014 | Ling | | G06F 17/30979 455/412.1 |
| 2003/0005290 A1* | 1/2003 | Fishman | | G06F 21/31 713/156 |
| 2006/0253473 A1* | 11/2006 | Agrawal | | G06F 16/278 |
| 2007/0027860 A1* | 2/2007 | Bestgen | | G06F 16/24544 |
| 2007/0038651 A1* | 2/2007 | Bernstein | | G06F 17/30587 |
| 2007/0086358 A1* | 4/2007 | Thubert | | H04L 45/12 370/254 |
| 2008/0043951 A1* | 2/2008 | Yap Ye | | G06Q 20/16 379/114.14 |
| 2008/0172362 A1* | 7/2008 | Shacham | | G06F 16/951 |
| 2009/0006338 A1* | 1/2009 | Ives | | G06F 17/30867 |
| 2010/0036830 A1* | 2/2010 | Lee | | G06F 16/9032 707/708 |
| 2010/0086111 A1* | 4/2010 | Gruchala | | H04M 3/42059 379/93.17 |
| 2010/0250518 A1* | 9/2010 | Bruno | | G06F 16/24 707/718 |
| 2011/0047146 A1* | 2/2011 | Scott | | G06F 17/30286 707/722 |
| 2011/0276442 A1* | 11/2011 | Momtahan | | G06Q 30/00 705/30 |
| 2012/0066745 A1* | 3/2012 | Wuthnow | | G06F 21/6245 726/4 |
| 2012/0158795 A1* | 6/2012 | Ireland | | G06F 17/30383 707/803 |
| 2013/0031084 A1* | 1/2013 | Herrnstadt | | G06F 16/221 707/714 |
| 2013/0212528 A1* | 8/2013 | Lazaridis | | G06F 3/14 715/810 |
| 2014/0099938 A1* | 4/2014 | Calo | | H04W 24/10 455/422.1 |
| 2015/0234935 A1* | 8/2015 | Gu | | G06F 16/9024 707/756 |
| 2016/0055233 A1* | 2/2016 | Wang | | G06F 16/2456 707/756 |

\* cited by examiner

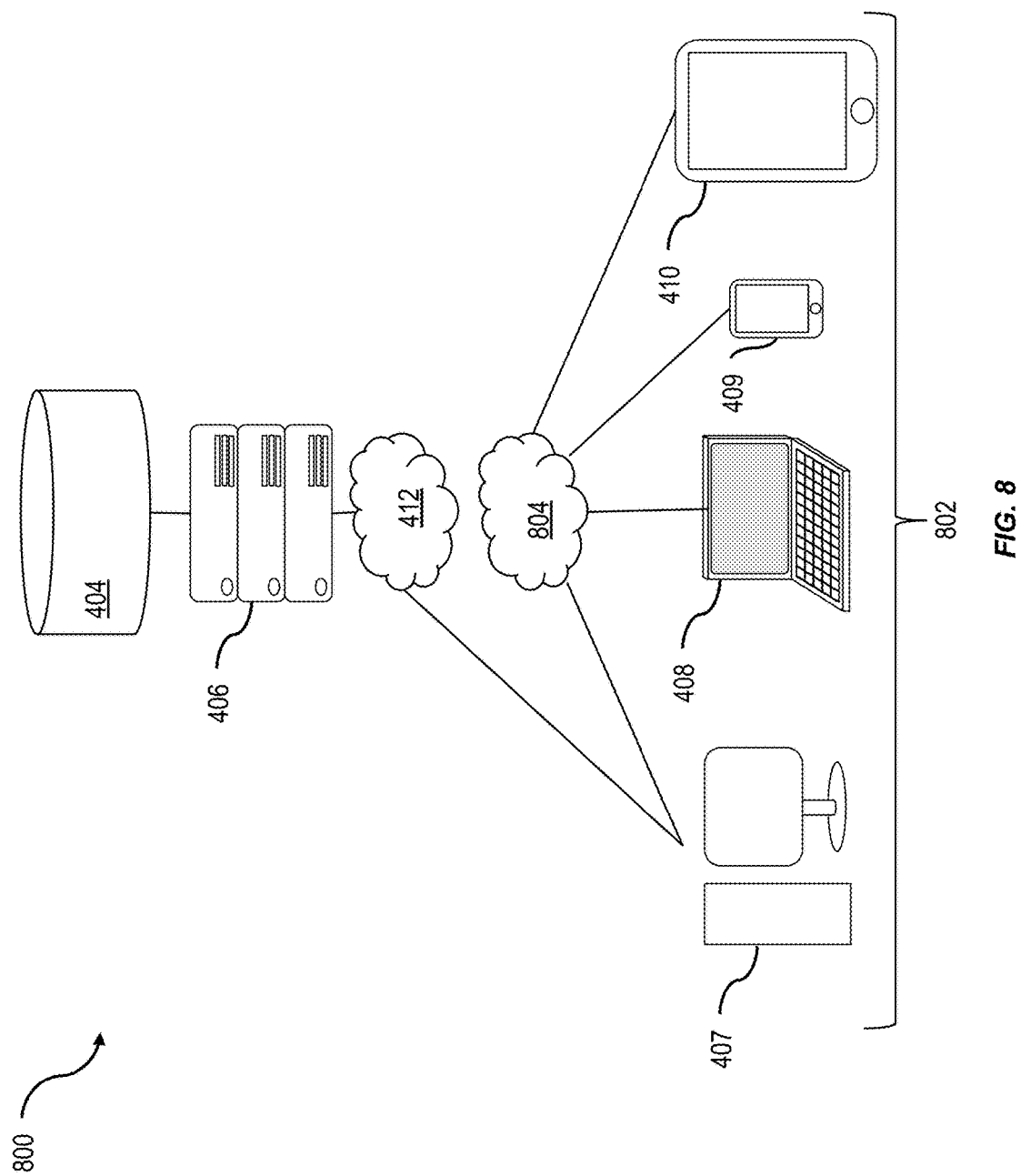

DATABASE MANAGEMENT FOR MOBILE DEVICES

TECHNICAL FIELD

The subject matter described herein relates to mobile database system for implementation by a mobile device.

BACKGROUND

The demand for ad-hoc and real-time data analyses by many users simultaneously is increasing in the same way that the data quantities to be processed are increasing. With the increased reliance on mobile devices, the desire of the same real-time data analyses on mobile devices is increasing.

To keep pace with the competition in the current economic climate, it is crucial to have the latest information about processes within an organization (e.g. a company) and/or in the market to be able to make the right decisions promptly. Those decision makers may be away from a stationary terminal or full-size laptop computer, and may desire to be able to make these decisions based on information obtained through a mobile device.

Large data sets that are to be processed can oftentimes exceed the available memory and processing abilities of a mobile device, preventing the data sets from being completely loaded into the available memory of the mobile device.

SUMMARY

In one aspect, a method is provided. The method can comprise receiving, from a mobile device, a request to transmit a subset of the data stored on a database associated with a database management system. The request can include an indication of a user associated with the mobile device. A database management system can perform a set of queries on the database to generate a subset of the data stored on the database. The set of queries can be based on the indication of the user. The subset of the data stored on the database can be transmitted to the mobile device for local storage on the mobile device to support database operations performed by the mobile device.

In some implementations, the above-noted aspects may further include additional features described herein including one or more of the following. The request can comprise an indication of the identity of the mobile device and the selecting of the subset of data is based on the identity of the mobile device. The indication of the identity of the mobile device can facilitate determination of one or more characteristics of the mobile device. The set of queries can be based on characteristics of the mobile device.

Changes to the data stored on the database can be monitored. The monitored data can correspond with data stored locally on the mobile device. The mobile device can be updated with the changes to the data. Requests, from the mobile device, for data stored in the database, can be monitored. The requested data can be transmitted in response to a determination that the requested data has been requested by the mobile device more than a threshold number of times.

Data use information associated with the user's interaction with the data stored locally on the mobile device and stored in the database can be received by the database management system. Data can be selected from the database to augment the data locally stored on the mobile device based on the user's use of the data stored locally on the mobile device and stored in the database. The selected data can be transmitted to the mobile device associated with the user for storing locally on the mobile device.

In another aspect a method is provided. The method can include one or more operations comprising receiving an input from a user indicating a user identity, the user having privileges to access data stored in a database. A request can be transmitted to a database management system. The request can include a request for data to be stored locally on the mobile device and an indication of the user's identity. A subset of the data stored on a database associated with the database management system can be received at the mobile device for storing locally on the mobile device. Storing the database data locally on the mobile device can facilitate performance, by the mobile device, of database operations.

In some implementations, the above-noted aspects may further include additional features described herein including one or more of the following. The mobile device can be configured to store the subset of the data on the mobile device in accordance with a set of data storage rules. A determination can be made that requests for a particular set of data from the database have exceeded a threshold number of requests. A request can be transmitted, to the database management system associated with the database, for transmission of the particular set of data for storage locally on the mobile device. The particular set of data can be stored locally on the mobile device in response to receiving the data. The request can be transmitted in response to a determination that the mobile device has a Wi-Fi connection for transmitting and receiving data.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
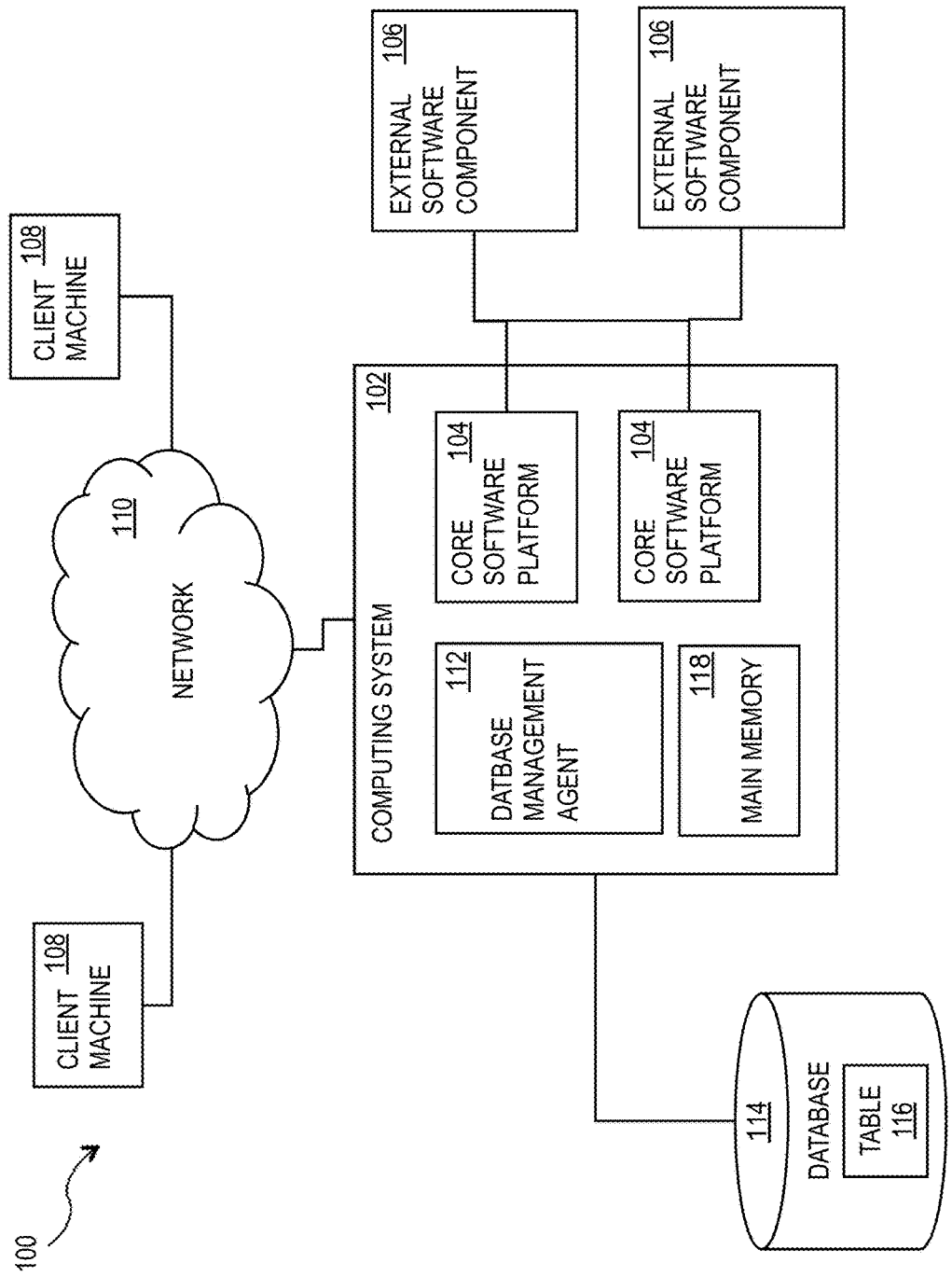
FIG. 1 shows a diagram of a system that can implement one or more features consistent with the current subject matter.

The presently described subject matter relates to providing enterprise database functionality on mobile computing devices that typically have lower processing and memory storage abilities compared to a desktop computer or user terminal in an office setting. Mobile computing devices that typically connect wirelessly with application servers through one or more networks, such as the Internet, typically have limited ability to send and receive large volumes of data compared to client devices directly wired to a database system network. Furthermore, the local processing and memory handling capabilities of mobile computing devices can be limited compared to wired client devices.

Presently described, are systems, methods and computer program products for facilitating interaction with an enterprise database system, or enterprise resource planning (ERP) system, by mobile computing devices. The presently described subject matter facilitates storing a portion of the enterprise data on mobile computing devices to avoid the necessity, by the mobile computing device, of calling the database system.

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

The mobile computing device can be configured to perform operations associated with one or more layers of the database management system. In some variations, the mobile computing device can be configured to perform one or more operations of the middle layer (APPLICATION LAYER=SUB-DATA SET=MIDDLE LAYER)

FIG. 1 shows a diagram of a system 100 that can interact with a database 114. A computing system 102 can include one or more core software platform modules 104 providing one or more features of a business software system or other software that includes database management features. The computing system can also aggregate or otherwise provide a gateway via which users can access functionality provided by one or more external software components 106. One or more client machines 108 can access the computing system, either via a direct connection, a local terminal, or over a network 110 (e.g. a local area network, a wide area network, a wireless network, the Internet, or the like).

A database management agent 112 or other comparable functionality can access a database 114 that includes at least one table 116, which can in turn include at least one column. The database management agent 112 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 112 or other comparable functionality can be configured to load a database table 116, or other comparable data set, into the main memory 118. The database management agent 112 can be configured to load the information from the database 114 to the main memory 118 in response to receipt of a query instantiated by a user or computer system through one or more client machines 108, external software components 106, core software platforms 104, or the like.

Figure 2:
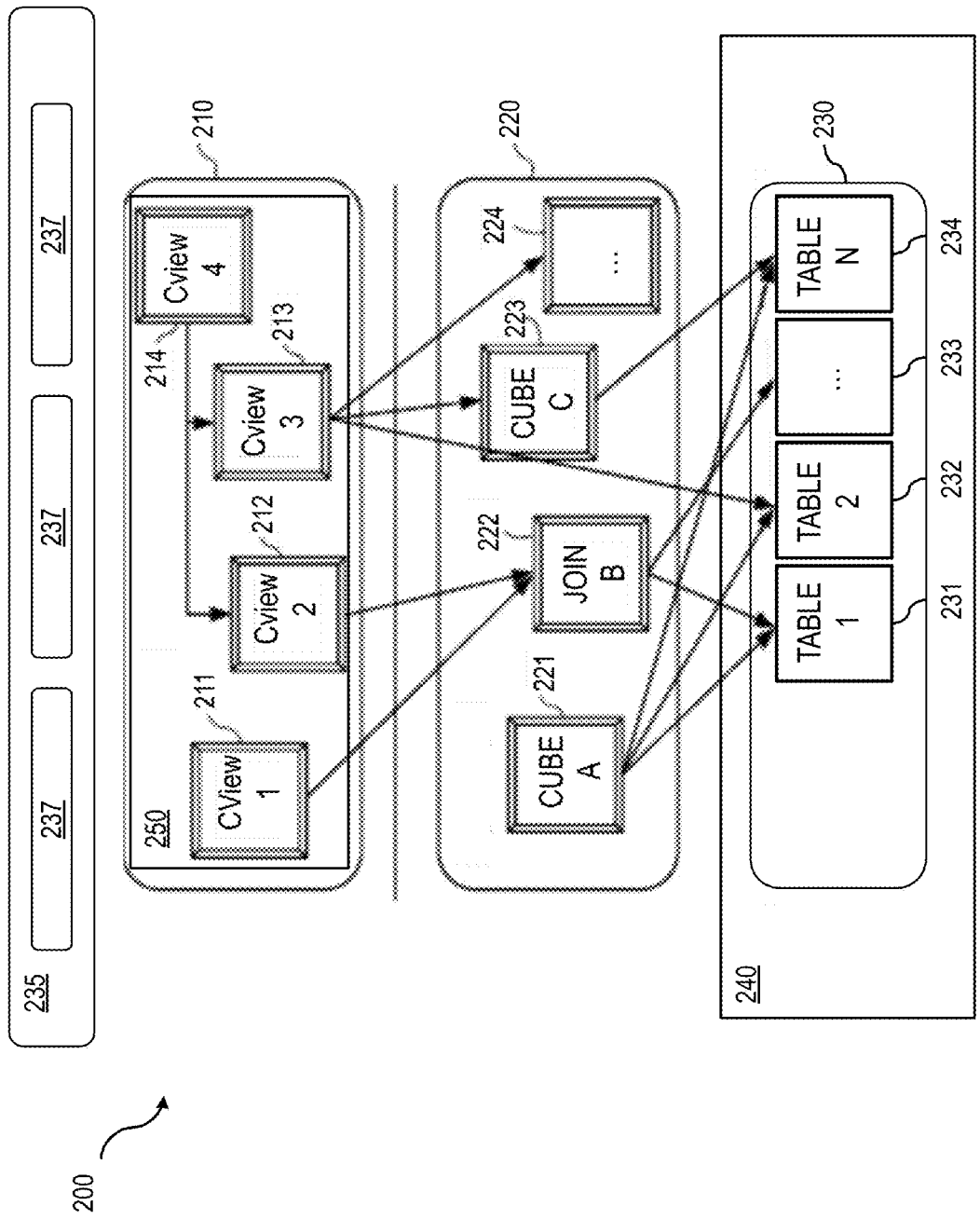
FIG. 2 is a diagram that illustrates a computing architecture having one or more features consistent with the current subject matter.
Figure 3:
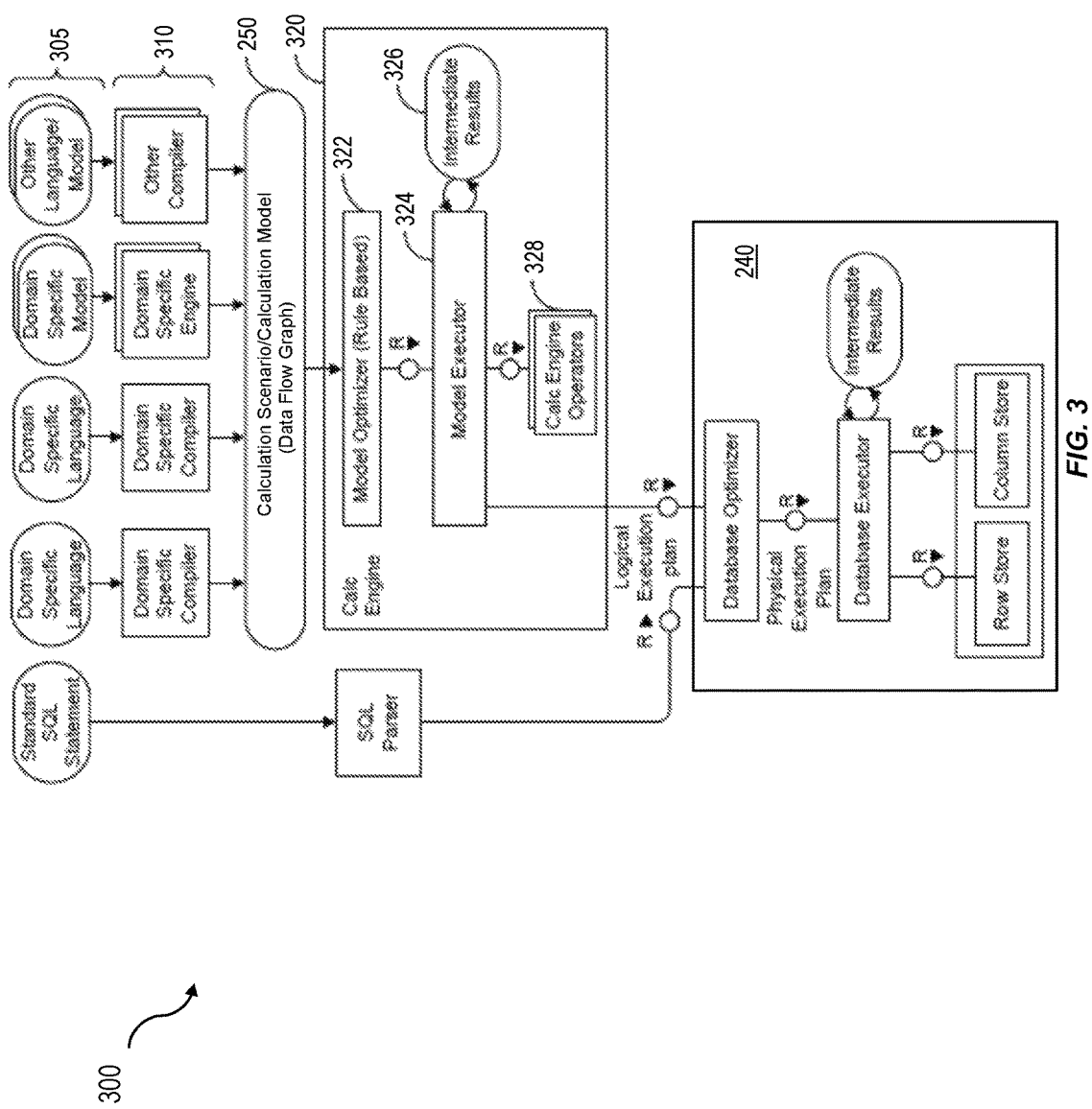
FIG. 3 is a diagram illustrating a sample architecture for request processing and execution control, the sample architecture having one or more features consistent with the current subject matter.

FIG. 2 is a diagram that illustrates a computing architecture 200 including a database system that includes three layers: a top layer, calculation engine layer 210, an intermediate layer, or logical layer 220, and a top layer, or physical table-pool 230. One or more application servers 235 implementing database client applications 237 can access the database system 300, as shown in FIG. 3. Calculation scenarios can be executed by a calculation engine, which can form part of a database or which can be part of the calculation engine layer 210 (which is associated with the database). The calculation engine layer 210 can be based on and/or interact with the other two layers, the logical layer 220 and the physical table pool 230. In some variations, the physical table pool 230 can comprise database operations configured to access and perform the database operations on the individual tables. In some variations, the basis of the physical table pool 230 consists of physical tables (called indexes) containing the data, which can be stored on one more database servers 240. Various tables 231-234 can be joined using logical metamodels 221-224 defined by the logical layer 220 to form an index. For example, the tables 231-234 in a cube (e.g. an online analytical processing or "OLAP" index) can be assigned roles (e.g., fact or dimension tables) and joined to form a star schema. It is also possible to form join indexes (e.g. join index B 222 in FIG. 2), which can act like database views in computing environments such as the Fast Search Infrastructure (FSI) available from SAP SE of Walldorf, Germany.

A calculation scenario 250 can include individual nodes (e.g. calculation nodes) 211-214, which in turn can each define operations such as joining various physical or logical indexes and other calculation nodes (e.g., CView 4 is a join of CView 2 and CView 3). That is, the input for a node 211-214 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 250, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 250 can be created which can be reused by multiple queries even if such queries do not require every attribute specified by the calculation scenario 250. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Every calculation scenario 250 can be uniquely identifiable by a name (e.g., the calculation scenario 250 can be a database object with a unique identifier, etc.). Accordingly, the calculation scenario 250 can be queried in a manner similar to a view in a SQL database. Thus, the query is forwarded to the calculation node 211-214 for the calculation scenario 250 that is marked as the corresponding default node. In addition, a query can be executed on a particular calculation node 211-214 (as specified in the query). Furthermore, nested calculation scenarios can be generated in which one calculation scenario 250 is used as source in another calculation scenario (e.g. via a calculation node 211-214 in this calculation scenario 250). Each calculation node 211-214 can have one or more output tables. One output table can be consumed by several calculation nodes 211-214.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 250 (which is also referred to in in FIG. 3 as a calculation model). To achieve enhanced performance, the models and programs written in these languages are executed inside the database server 240. This arrangement eliminates the need to transfer large amounts of data between the database server 240 and a client application 237, which can be executed by an application server 235. Once the different artifacts 305 are compiled into this calculation scenario 250, they can be processed and executed in the same manner. A calculation engine 320 executes the calculation scenarios 250.

A calculation scenario 250 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 237 at the application server 235). Inputs can be connected to tables or to the outputs of other nodes. A calculation scenario 250 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 250 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 250 can be defined as part of database metadata and invoked multiple times. A calculation scenario 250 can be created, for example, by a SQL statement "CREATE CALCULATION SCENARIO <NAME> USING <XML or JSON>". Once a calculation scenario 250 is created, it can be queried (e.g., "SELECT A, B, C FROM <scenario name>", etc.). In some cases, databases can have pre-defined calculation scenarios 250 (default, previously defined by users, etc.). Calculation scenarios 250 can be persisted in a repository (coupled to the database server 240) or in transient scenarios. Calculation scenarios 250 can also be kept in-memory.

Calculation scenarios 250 are more powerful than traditional SQL queries or SQL views for many reasons. One reason is the possibility to define parameterized calculation schemas that are specialized when the actual query is issued. Unlike a SQL view, a calculation scenario 250 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 250 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 250. This instantiated calculation scenario 250 is optimized for the actual query and does not contain attributes, nodes or data flows that are not needed for the specific invocation.

When the calculation engine 320 gets a request to execute a calculation scenario 250, it can first optimize the calculation scenario 250 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 250. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 250 (not implemented in the calculation engine 320) can be transformed by the model executor 324 into a set of logical database execution plans. Multiple set operation nodes can be combined into one logical database execution plan if possible.

The calculation scenarios 250 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 250 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

A calculation scenario 250 as described herein can include a type of node referred to herein as a semantic node (or sometimes semantic root node). A database modeler can flag the root node (output) in a graphical calculation view to which the queries of the database applications directed as semantic node. This arrangement allows the calculation engine 320 to easily identify those queries and to thereby provide a proper handling of the query in all cases.

To process queries submitted through the calculation engine layer 210 using a calculation scenarios 250, the physical layer 230 may be required to load one or more tables 231-234 into the main memory 118 of the computing system 102. There may be occasion where there is insufficient capacity to load one of the tables, in its entirety, into the memory. Not having the whole table in the main memory 118 can create a situation here the computing system 102 has to continually communicate with disk memory on which a copy of the table may be stored. This increases the processing time of the executed calculation scenario 250.

Similarly, the calculation nodes 211-214 may include one or more constraints that narrow the part of the table that needs to be processed. The constraints may result in a subset of the rows of a table that require processing. Consequently, there would be no need to load every row of the table into the main memory 118 of the computing system 102.

Figure 4:
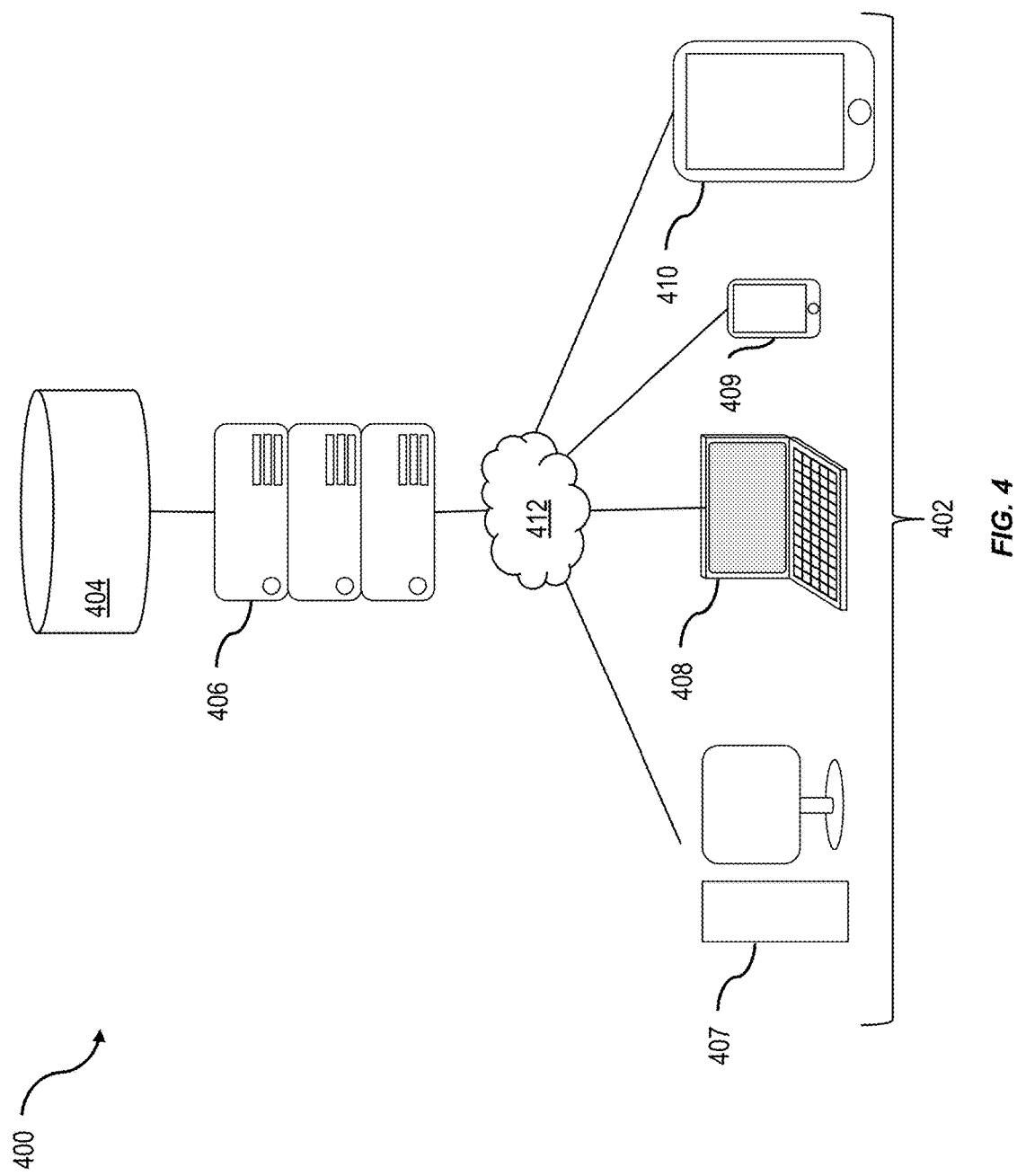
FIG. 4 is an illustration of an exemplary graphical calculation view having one or more features consistent with the current subject matter.

FIG. 4 is an illustration of a system 400 having one or more features consistent with the presently described subject matter. A user of a mobile device 402 may have access privileges to information stored on a database 404. A database management system 406 can be configured to provide database management functions. For example, the database management system 406 can be configured to perform one or more of the functions described above with respect to the computer system 102 illustrated in FIG. 1, the computing architecture 200 illustrated in FIG. 2, the database system 300 illustrated in FIG. 3, or the like.

The database management system 406 can be accessed by multiple different types of mobile devices 402, for example, a desktop 407, laptop 408, smart phone 409, tablet 410, or other mobile devices. The mobile client devices can be configured to communicate with the database management system 406 through a network 412, for example, a local area network, a virtual private network, the Internet, or the like. Some client devices may be connected to the database management system 4064 locally, through a local network. Some client devices may be connected to the database management system 406 remotely, through, for example, the Internet. Remotely connected client devices may use wireless communication signals to communicate with the database management system 406. This form of communication can be particularly slow and cumbersome, especially when there are multiple actors between the client device and the database management system 406.

By way of example, the mobile device 402 may wirelessly connect to a network operated by a wireless carrier. This may be through one or more wireless cells operated by the wireless carrier. Data transmitted between a base station of a cell and the mobile device 402 may be transmitted to an Internet node of the wireless carrier. The data may then be transmitted to a node operated by an Internet service provider (ISP) that provides Internet service to the database management system 406. The data may be transmitted from the node operated by the ISP to a local network associated the database management system 406. Eventually, the data may reach and be processed by the database management system 406. At each of these actors, and in between actors, the data must pass through multiple switches, routers, trunks, and other data communication hardware. This can make transmission of the data cumbersome and increase the time it takes for the data to be transmitted. Data can also degrade through the transmission process. This is particularly problematic when particular data or calculation scenarios are repeatedly accessed or performed.

In some variations, mobile devices 402 can be pre-registered to the database 404 and/or database management system 406. Pre-registered mobile devices 402 can include authentication devices (including hardware, software, and firmware authentication devices) to authenticate the mobile devices 402 when the mobile devices 402 request data from the database management system 406. Such pre-registered devices are typically owned by the organization operating, or a tenant of, the database management system 406. In other variations, mobile devices 402 may be personal mobile devices 402 owned by users. Various software applications can be used to authenticate the user and their mobile device so that the user can access the data stored on the database 404.

Figure 5:
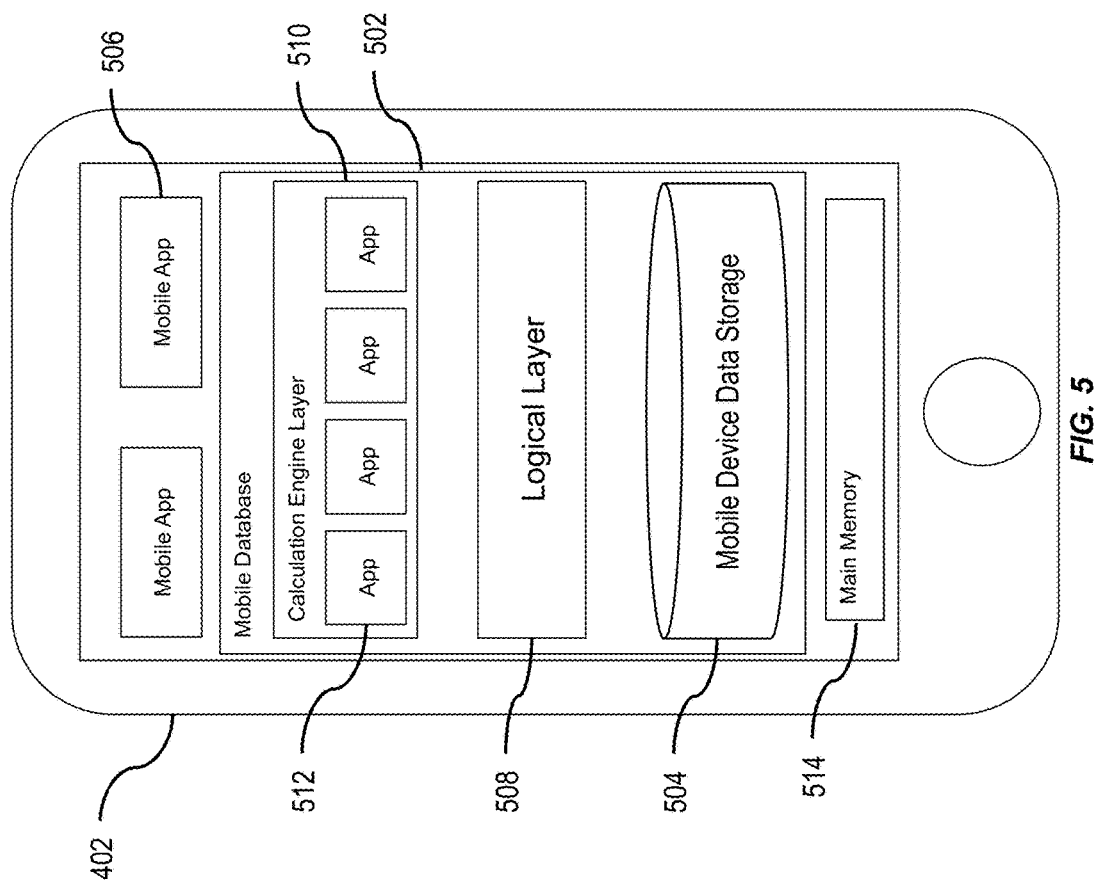
FIG. 5 is a conceptual illustration of a table of a database system having one or more features consistent with the present description.

The presently described subject matter, facilitates storage of data on mobile client devices, such as the mobile computing device 402, the tablet 410, the laptop/desktop 408. FIG. 5 is an illustration of the mobile computing device 402 configured to perform one or more functions consistent with the presently described subject matter. In some variations, an application can be downloaded to the mobile computing device 402. The application can be configured to facilitate setting up of the mobile computing device 402 to interact with the database management system 406. The application may be configured to facilitate set up of a mobile version of the database management system 406, or mobile database 502.

Basic: all applications will have access based on unique ID of the mobile. Personalized=certain part of DB only accessible to users; piggy-back off the authentication of the DB. Bio-metric encryption (finger print/retina); standard ways for authentication; DB can be associated;

The applications 506 can access information from certain parts of the database 404 based on a unique ID associated with the user of the mobile computing device 402. In some variations, the applications 506 may be configured to access information from certain parts of the database 404 based on a unique ID of the mobile computing device 402. Only information, stored on the database 404, that the user and/or mobile device can be downloaded to the mobile computing device 402 and stored in the mobile device data storage 504.

The applications 506 can be configured to piggy-back authentication with the database 404 based on user credentials entered by the user into the mobile computing device 402 and/or mobile computing device credentials of the mobile computing device 402. Access to the information stored on the mobile device data storage 504, database 404 or the like may require multiple-stage authentication. Multiple-stage authentication can include a password and biometric information, a password and entry of a rolling verification code, or the like. The mobile computing device 402 may include biometric sensors. A user of the mobile device 402 can be prompted to provide biometric verification through one or more sensors of the mobile computing device 402. Biometric sensors can include, for example, a retina scanner, a camera to capture iris images, fingerprint capture devices, microphones to facilitate voice recognition, or the like.

The mobile database 502 can be configured to perform a subset of the operations described with respect to the computer system 102 illustrated in FIG. 1, the computing architecture 200 illustrated in FIG. 2, the database system 300 illustrated in FIG. 3, or the like. In some implementations, during setup of the mobile database 502 on the mobile device 402, an analysis of the user's database management system use habits may be performed. The analysis of the user's database management system use habits may include accessing a user profile, of the user, stored on a data management system, such as database management system 406. The profile of the user can include privilege information. The privilege information can provide an indication of which data, stored on the database 404, that the user can access. The privilege information can provide an indication of which combination of data sets, or which queries may be run and/or viewed by the user. In some variations, a user may have privileges to run a query but may not have privileges to see the results. The results may be forwarded to a user that does have privileges to view the results.

The user profile of the user of the mobile device 502 may include an indication of the data regularly accessed by the user. In some variations, the tables that contain that data may be requested from the database 404 for local storage on a memory 504 of the mobile device 402. In some variations, a subset of the data in the table, or a subset of data in a combination of tables, may be downloaded from the database 404 for local storage on a memory 504 of the mobile device 402.

The user profile of the user of the mobile device 402 may include one or more user parameters. The user parameters may be used to group users into cohorts. Each cohort of users may include a group of users having similar or the same set of user parameters. A user belonging to a particular cohort can indicate which data on the database 404 the user may access on a regular basis and therefore form the basis for identifying which data to store locally on the mobile device 402 associated with the user.

Cohorts of users have similar user parameters. Consequently, the users of the cohort are likely to access and use the data stored on the database 404 in a similar manner. A change in the use of the data by a user cohort can indicate to the database management system 406 a need to update the data stored on the mobile devices 402 associated with the users of the cohort.

To obtain the data to be stored locally on a memory 504 of the mobile device 402, the database management system 506 can be configured to perform one or more calculation scenarios, such as calculation scenarios 250 illustrated in FIGS. 2 and 3. Some users may have specific tasks within an organization. Those users may access particular datasets regularly and perform the same low-level, or medium level, queries regularly. In fact, some users, by the nature of their privileges, may default to a set of queries for every query that they run. During the queries, logical metamodels, such as logical metamodels 221-224 illustrated in FIG. 2, can be used to join various tables, such as tables 231-234 illustrated in FIG. 2, to form an index. A calculation scenario can be generated which uses the index. The calculation scenario can be used by multiple different queries. This can yield the data most-accessed by the user of the mobile device 402 which is the data that should be locally stored on the mobile device 402.

The database 404 can include a plurality of framework optimizations functions. For example, multiple indexes can be generated for each table or set of tables within a database. The database system can be configured to continuously analyze the indexes to determine which index is the fastest for processing certain queries from certain users. The multiple indexes can be configured to continuously track data on the mobile device 402 and consistently map the data stored on the mobile device 402 with the data in the database 404.

During setup of the mobile database system 502, an analysis of data-using applications 506 that are installed on the mobile device 502 can be performed. The data-using applications 506 can include one or more applications configured to access, or configured to use, data stored on the database 504. An analysis of the frequency of the use of these data-using applications 506 can be performed to determine how regularly a user accesses various data associated with individual ones of the data-using applications 506. An analysis of the similarity of the data accessed and/or used by different data-using applications 506 can be performed. From the analysis of the data-using applications a determination can be made as to which data stored on the database 404 should be stored locally on the mobile device 402. Data that is accessed infrequently or is within particular size constraints, need not be stored locally, whereas it may be desirous to store other data locally on the mobile device 402.

The memory 504 may be partitioned during setup of the mobile database 502. One partition of the memory 504 can be reserved for use by the mobile database 502. The mobile database 502 can be configured to facilitate erasing of the data stored on the partition, of the memory 504, reserved for use by the mobile database 502 in the event of loss of the mobile device 402, or the like.

The subset of the data from the database 404 may include data that has been aggregated and sorted based on user profile information and mobile device information. Consequently, the mobile database 502 may not include a physical layer as described above with respect to the database computing architecture 200 illustrated in FIG. 2. The mobile database 502 may include a logical layer 508. The logical layer 508 may perform one or more operations that are consistent with the logical layer 220 illustrated in FIG. 2. The logical layer 508 can be configured to consolidate concepts and instructions received from a user's interaction with the mobile device 402. The logical layer 508 can be configured to provide execution pathways to the various pieces of data within the data storage 504 of the mobile device 402.

The mobile database 502 can include an application layer, or view layer 510. The view layer 510 can be configured to implement applications 512 that are provided to the user of the mobile device 402. The view layer 510 can be a calculation engine layer, such as calculation engine layer 250 illustrated in FIGS. 2 and 3.

The view layer 510 can be configured to implement applications 512 on the mobile device 402. A user may interact with the application 512 through the mobile device 402. Based on the application 512 and/or user input through the mobile device 402, the view layer 510 may be configured to load at least a portion of the locally stored data into a main memory 514 of the mobile device 402. The data loaded into the main memory 514 may include data that is accessed frequently by one or more of the implemented applications 512. Whether data is accessed frequently can be based on a user's historical interactions with an application and/or data set, or can be based on the type of application 512 implemented by the view layer 510.

In some variations, the mobile device 402 may have one or more applications configured to access and/or use data stored on local storage of the mobile device database storage 504. One or more of the applications 512 implemented by the view layer 510 can be configured to communicate data with the requesting mobile application 506.

The database 404 may be horizontally partitioned. The horizontal partitioning may be performed based on a context of the data stored in a table. For example, a table may include rows that are associated with different regions. Rows associated with a particular region may be accessed most frequently by computing devices located within that region. To increase the efficiency of a distributed computing system, the table may be horizontally partitioned so that rows of a table associated with a particular region are stored within that region. This can facilitate quicker read/write of data to those rows by the computing devices that read/write data to those rows more frequently.

The location of the mobile computing device can be used as a basis to determine what information is to be downloaded and stored to the mobile device data storage 504.

Furthermore, by horizontally partitioning data, the load on the data can be reduced. Instead of everyone performing read/write actions on a single table, with horizontal partitioning those users are divided between the various horizontal partitions, thereby reducing the load on any one database element. Providing database access to mobile computing devices will greatly increase the load on that database. Horizontal partitioning and associating mobile devices based on the horizontal partitions and the needs of the users of the mobile devices.

The storage of the data from the database 404 on the mobile device data storage 504 may have a uniform structure. The uniform structure of the data stored on the mobile device data storage 504 can facilitate homogeneity between the various database applications 512 and the mobile applications 506 on the mobile device 402. Developers of the mobile database 502 can specify a set of uniform rules that can be followed by application developers.

Data consistency between the mobile device 402 and the database 404, especially when the mobile device 402 is not in electronic communication with the database 404 is important. Rules can be developed for the mobile database 502 and the database 404 which dictate how the consistency of data is maintained. For example, when a mobile device 402 is in an off-line mode, e.g. not connected to the database 404, any changes made by using mobile device 402 with the data stored on the mobile device data storage 504, can be assigned to a draft state.

When the mobile database 502 reconnects with the database 404, the mobile database 502 can reconcile the data stored on the mobile device data storage, and the data in a draft state, with the data stored in the database 404.

Each change to data in the mobile device data storage 504 can be tagged with a timestamp. During reconciliation of the data on the mobile device data storage 504 with the database 404, the data can be reconciled based on the timestamps. In some variations, the data having the latest time stamp can prevail over data having an earlier timestamp. The data with the latest timestamp can be saved to the database 404.

Multiple users may modify the same data when their mobile devices are offline. The data can be stored in a draft state on their own mobile devices. When one mobile database 502 reconciles its data with the main database 404, the data on the main database 404 can be updated. Subsequent users who also edited the data may have edited the data in an inconsistent manner. This inconsistency can generate a conflict.

Rules can be initiated which dictate how inconsistencies in changes to the data stored on the database 404 are handled. For example, one user can be designated a super user. The super user, as used herein, is any user who can decide which data is preserved and which data is discarded when there is a conflict. The super user can receive a notification of a potential conflict between data saved to the database 404 from one mobile database 502 and data attempted to be saved to the database 404 from another mobile database. The super user can decide whether to combine the data and/or decide which data will be stored to the database 404 and which will be discarded.

The super user may be the user of the mobile database 502 that was the last mobile database 502 to attempt reconciliation of its data with the data in the database 404. The super user may be a supervisor of other users using the database 404.

When mobile applications 506 or applications 512 require data not stored locally, the mobile database 502 can be configured to request the additional data from the database management system 406. The additional data can be stored locally on the mobile device 402 updating the data stored locally on the mobile device 402.

In some variations, a user profile for a user of a mobile device 402 can be maintained by the database management system 406. The user profile maintained by the database management system 406 can include an identification of the mobile device 402 associated with the user, one or more characteristics of the mobile device 402 associated with the user, for example electronic data storage capacity, main memory capacity, processing capabilities, and/or the like. The user profile maintained by the database management system 406 can maintain a usage history of the data accessed by the user.

The user profile can include an indication of the data that is locally stored on the mobile device 402 associated with the user. The user profile can include an indication of the mobile applications 506, applications 512, and/or queries that are performed on the data stored locally on the mobile device 402.

The database management system 406 can be configured to facilitate determination of when data stored on the database 404, that corresponds to data stored locally on the mobile device 402, has changed, compared the data stored on the mobile device 402. In some variations, logs of data changes can be maintained by the database management system 406. The logs of data changes can indicate a time at which the changes occur. The user profile maintained by the database management system 406 for the user associated with the mobile device 402 can include an indication of the time at which data on the mobile device 402 was last synchronized with data stored in the database 404. In response to logs of data changes indicating a change to the data after the last synchronization with the mobile device 402, the database management system 406 can be configured to provide the updated data to the mobile device 402. In some variations, the synchronization can occur in response to a threshold amount of difference between the data stored in the database 404 and the data stored on the mobile device 402. In some variations, the synchronization can occur in response to an indication, in the data change logs, that a critical piece of data has changed.

The data can be stored on the mobile device 402 such that only the changed data need be updated instead of having to download the entire dataset from the database 404, through the database management system 406.

In some variations, the database management system 406 may be configured to push data updates to the mobile device 402. In other variations, the mobile device 402 may be configured to request data updates from the database management system 406. The mobile database 502 may be configured to cause the mobile device 402 to request updates in response to an indication that the mobile device 402 complies with one or more data connection configurations. For example, downloading of data may be performed in response to an indication that the mobile device 402 is communicating with the database management system 406 through a Wi-Fi connection rather than a paid data connection. In another example, downloading of data may be performed in response to an indication that the mobile device 402 is communicating with the database management system 406 through a connection having above a threshold bandwidth.

In some variations, the mobile database 502 can be configured to facilitate updating of the data stored on the mobile computing device 402. Updates to the data stored in the memory 504 of the mobile database 502 can be pushed, by the mobile database 502 and through the mobile device 402, to the database management system 506. Change logs can accompany the updated data. The database management system 406 can be configured to incorporate the updated data into the data stored in the database 404.

Figure 6:
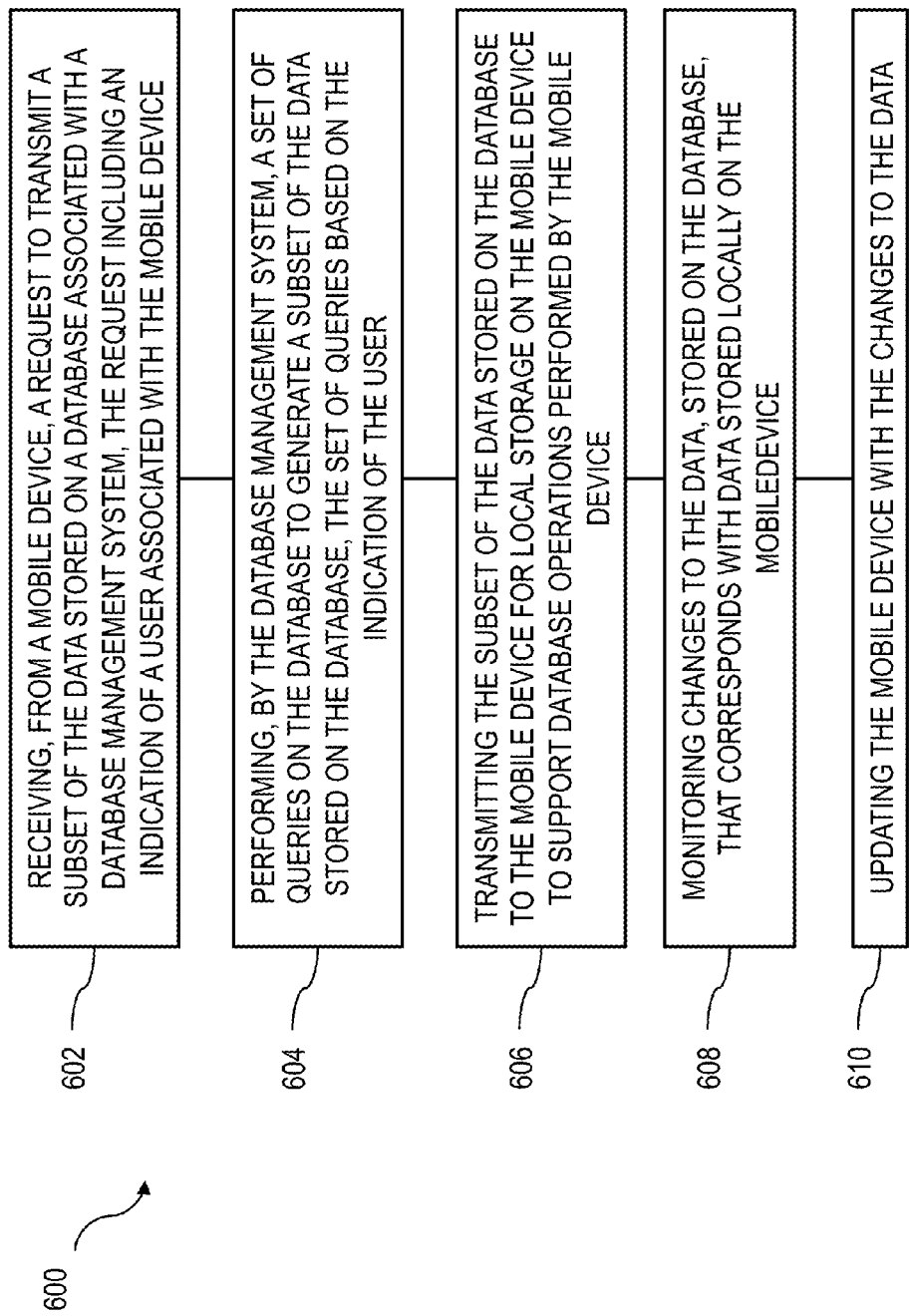
FIG. 6 is a process flow diagram illustrating a method with one or more features consistent with the presently described subject matter.

FIG. 6 is a process flow diagram 600 illustrating a method having one or more features consistent with the presently described subject matter.

At 602, a request can be received from a mobile device. The request can include a request to transmit a subset of the data stored on a database associated with a database management system. The request can include an indication of a user associated with the mobile device. The request may include an indication of the identity of the mobile device and the selecting of the subset of data is based on the identity of the mobile device. The indication of the identity of the mobile device can facilitate determination of one or more characteristics of the mobile device.

At 604, a set of queries can be performed, by the database management system, on the database. The queries on the database can generate a subset of the data stored on the database, the set of queries based on the indication of the user. The set of queries can be based on characteristics of the mobile device.

At 606, the subset of the data stored on the database can be transmitted to the mobile device for local storage on the mobile device. Local storage of the subset of data on the mobile device can support database operations performed by the mobile device.

At 608, changes to the data, stored on the database, that corresponds with data stored locally on the mobile device can be monitored. The monitoring can be performed by the database management system.

At 610, the mobile device can be updated with the changes to the data. The mobile device can be updated in response to an indication that the data stored on the database has changed a threshold amount compared to when the data was originally provided to the mobile device.

In some variations, requests, received from the mobile device, for data stored in the database may be monitored. The requested data can be transmitted to the mobile device, for locally saving to support database operations performed by the mobile device, in response to a determination that the requested data has been requested by the mobile device more than a threshold number of times.

In some variations, data use information associated with the user's interaction with the data stored locally on the mobile device and stored in the database may be received from the mobile device. Data, from the database, may be selected to augment the data locally stored on the mobile device based on the user's use of the data stored locally on the mobile device and stored in the database. The selected data may be transmitted to the mobile device associated with the user for storing locally on the mobile device.

Figure 7:
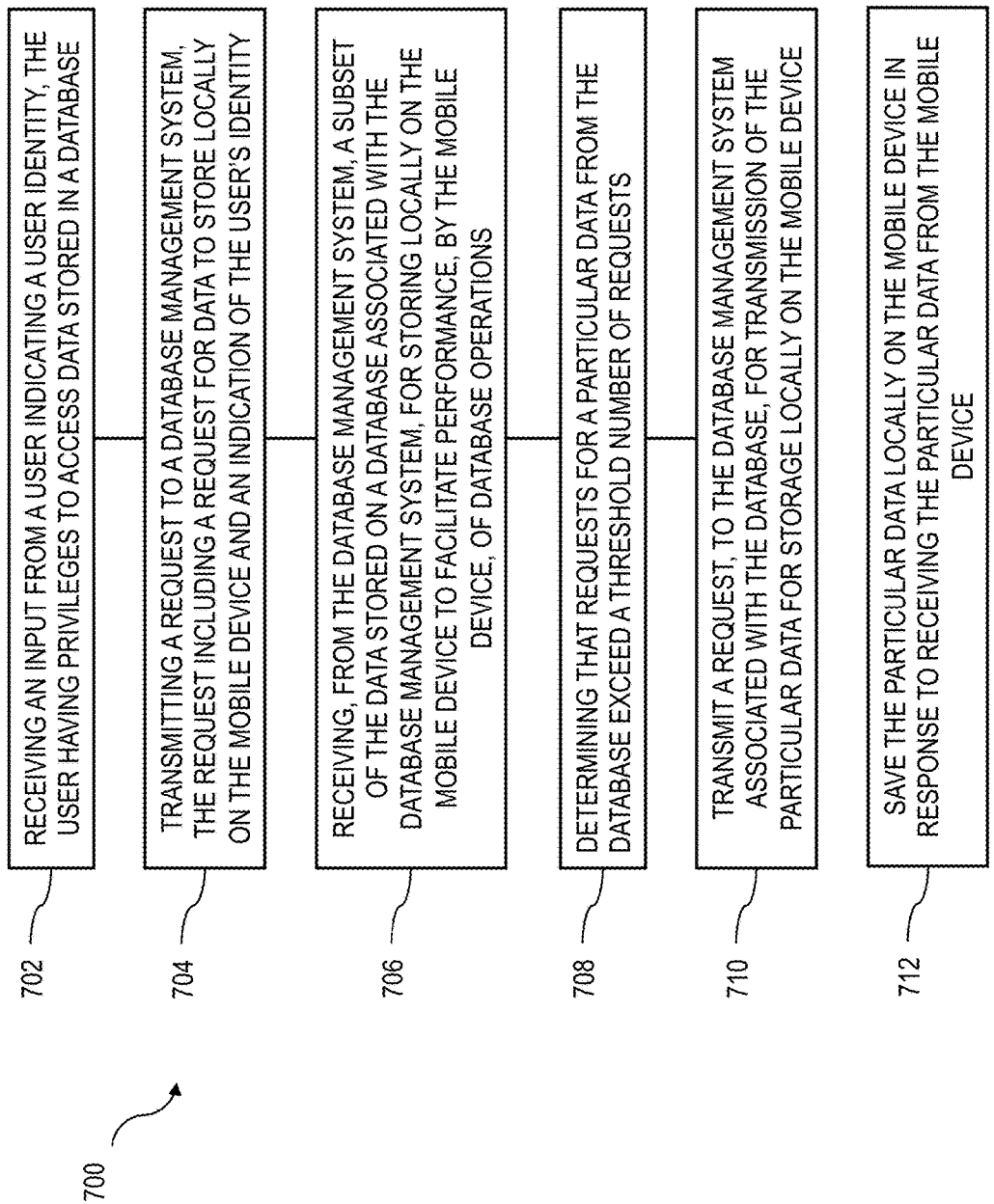
FIG. 7 is a process flow diagram illustrating a method having one or more features consistent with the presently described subject matter; and, FIG. 8 is an illustration of an exemplary graphical calculation view having one or more features consistent with the current subject matter.

FIG. 7 is a process flow diagram 700 illustrating a method having one or more features consistent with the presently described subject matter.

At 702 an input from a user indicating a user identity may be received. The user may have privileges to access data stored in a database.

At 704, a request may be transmitted to a database management system. The request can include a request for data to store locally on the mobile device and include an indication of the user's identity. The request may be transmitted in response to a determination that the mobile device has a Wi-Fi connection for transmitting and receiving data.

At 706, a subset of the data stored on a database associated with the database management system may be received from the database management system. The subset of the data may be received for storing locally on the mobile device to facilitate performance, by the mobile device, of database operations. The mobile device may be configured to store the subset of the data on the mobile device in accordance with a set of data storage rules.

At 708, a determination can be made that requests for a particular data from the database exceed a threshold number of requests.

At 710, a request can be transmitted to the database management system associated with the database. The request can include a request for transmission of the particular data for storage locally on the mobile device.

At 712, the particular data can be saved locally on the mobile device in response to receiving the particular data from the mobile device.

FIG. 8 is an illustration of a system 800, similar to system 400 illustrated in FIG. 4, having one or more features consistent with the described subject matter. In some variations a subscriber to a database 404 may have multiple mobile client devices 802 associated with it that have access to, and can modify, the data stored to the database 404. The mobile client devices 802 may be configured to store portions of the data stored on the database 404 locally in a memory of the mobile client devices 802. When one user of a mobile client device 802 associated with a subscriber modifies local data it will conflict with the data stored locally on each of the other mobile client devices 802.

When the mobile client devices 802 are connected with the database 404, any change in the locally stored data can be reconciled with the database 404. Updated data can then be provided from the database 404 to the other mobile devices 802. However, if one of the mobile client device 802 is not connected to the database 404, then that mobile client device 802 will not receive the updated data.

In situations where the mobile client devices 802 of a subscriber can communicate with each other through, say, a subscriber network 804, the data stored locally on one mobile computing device 802 can be reconciled with data stored locally on other mobile computing device 802 through the subscriber network 804. Data stored in the database 404 may be routed to a mobile computing device 802 through another mobile computing device 802 that is on the subscriber network 804. For example, data from the database 404 can be provided to a desktop computer that is in communication with a database server 406 through a network 412. A smartphone 409 may not be in communication with the database 404, but may be in communication with the desktop 407 through a subscriber network 804. Data from the database 404 can be provided to the smartphone 409 from the desktop 407, through the subscriber network 804.

Similarly, data that is modified on, say, a tablet 410 can be provided to the other client computing devices without the need to reconcile it with the database 404. For example, data updated on the tablet 410 can be provided to a smartphone 409 and/or laptop 408 through a subscriber network 804, even though no device is in communication with the database 404. When one of the of the devices connects with the database 404, the data stored on the database 404 can be reconciled with the data stored locally on the client computing devices.

As used herein, the subscriber network 804 can be a dedicated network operated by the subscriber, a public network upon which subscriber mobile client devices can intercommunicate, a semi-public network, or the like.

Without in any way limiting the scope, interpretation, or application of the claims appearing herein, a technical effect of one or more of the example embodiments disclosed herein may include facilitating the performance of database functions on mobile devices that otherwise do not have the connectivity of performance characteristics to perform the database functions ultimately providing those with decision making authority the information quickly and efficiently.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such backend, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method to be performed on one or more data processors comprising at least part of a computer system of a database management system, the method comprising:
   receiving, from a mobile device, a request to transmit a subset of the data stored on a database associated with a the database management system, the request including an indication of a user associated with the mobile device;
   identifying, based on the indication of the user, a subset of the data contained within the database to store locally on the mobile device, the identifying including identifying a calculation scenario associated with the user, the calculation scenario usable by multiple different queries and which uses an index formed from logical metamodels that join tables to form the index;
   performing, by the database management system and according to the calculation scenario, a set of queries on the database to generate the subset of the data stored on the database, the set of queries based on the indication of the user;
   transmitting the subset of the data stored on the database to the mobile device for local storage on the mobile device to support database operations performed by the mobile device, the mobile device including a mobile database to store the subset of data, wherein the database operations performed by the mobile device include querying the mobile database storing the subset of data;
   monitoring changes to the data, stored on the database, that corresponds with data stored locally on the mobile device; and
   updating the mobile device with the changes to the data;
   wherein the calculation scenario includes a directed acyclic graph including edges representing data flows and nodes representing operations, each node including a set of inputs and outputs and an operation that transforms the inputs into the outputs, wherein the inputs and outputs are user-defined table types that are passed into a procedure or function.

2. The method of claim 1, wherein the request further comprises an indication of the identity of the mobile device and the selecting of the subset of data is further based on the identity of the mobile device.

3. The method of claim 2, wherein the indication of the identity of the mobile device facilitates determination of one or more characteristics of the mobile device.

4. The method of claim 1, wherein the set of queries are based on characteristics of the mobile device.

5. The method of claim 1, further comprising:
   monitoring requests, received from the mobile device, for data stored on the database.

6. The method of claim 1, further comprising:
   receiving data use information associated with the user's interaction with the data stored locally on the mobile device and stored on the database;
   selecting data, from the database, to augment the data locally stored on the mobile device based on the user's use of the data stored locally on the mobile device and stored on the database; and,
   transmit the selected data to the mobile device associated with the user for storing locally on the mobile device.

7. The method of claim 1, wherein the mobile device is configured to perform one or more operations of a middle layer of the database management system.

8. The method of claim 1, wherein the database management system includes a user profile including an identification of the mobile device, one or more characteristics associated with the user, a usage history of data accessed by the user, an indication of data locally stored on the mobile device, and an indication of a mobile application.

9. The method of claim 1, further comprising at least:
   synchronizing data stored in the database and data stored on the mobile device in response to a threshold amount of difference between the data stored in the database and data stored on the mobile device.

10. A method to be performed on one or more data processors comprising at least part of a computer system of a mobile device, the method comprising:
    receiving an input from a user indicating a user identity, the user having privileges to access data stored in a database;
    transmitting a request to a database management system, the request including a request for data to store locally on the mobile device and an indication of the user's identity;
    identifying, based on the indication of the user, a subset of the data contained within the database to store locally on the mobile device, the identifying including identifying a calculation scenario associated with the user, the calculation scenario usable by multiple different queries and which uses an index formed from logical metamodels that join tables to form the index;

performing, by the database management system and according to the calculation scenario, a set of queries on the database to generate the subset of the data stored on the database, the set of queries based on the indication of the user;

transmitting the subset of the data stored on the database to the mobile device for local storage on the mobile device to support database operations performed by the mobile device;

receiving, from the database management system, a subset of the data stored on a database associated with the database management system, for storing locally on the mobile device to facilitate performance, by the mobile device, of database operations, wherein the subset of the data is identified by the database management system, the identifying including identifying a calculation scenario associated with the user, the calculation scenario usable by multiple different queries and which uses an index formed from logical metamodels that join tables to form the index;

storing the received subset of data within a mobile database located on the mobile device;

performing database operations by the mobile device using the mobile database, the database operations performed by the mobile device including querying the mobile database storing the subset of data;

wherein changes to the data stored on the database that corresponds with data stored locally on the mobile device is monitored and the mobile device is updated with the changes to the data;

wherein the calculation scenario includes a directed acyclic graph including edges representing data flows and nodes representing operations, each node including a set of inputs and outputs and an operation that transforms the inputs into the outputs, wherein the inputs and outputs are user-defined table types that are passed into a procedure or function.

11. The method of claim 10, wherein the mobile device is configured to store the subset of the data on the mobile device in accordance with a set of data storage rules.

12. The method of claim 11, wherein the request is transmitted in response to a determination that the mobile device has a Wi-Fi connection for transmitting and receiving data.

13. The method of claim 10, wherein the mobile device is configured to perform database operations using the subset of data stored locally on the mobile device while the mobile device is unconnected with the database management system.

14. The method of claim 10, further comprising:
determining that requests for a particular data from the database exceed a threshold number of requests;
transmitting a request, to the database management system associated with the database, for transmission of the particular data for storing locally on the mobile device; and,
saving the particular data locally on the mobile device in response to receiving the particular data from the database management system.

15. The method of claim 10, wherein the mobile device includes one or more mobile applications, the mobile database, and main memory, the mobile database including at least a calculation engine layer including one or more applications; a logical layer; and a mobile device data storage.

16. The method of claim 10, further comprising at least:
modifying data within the mobile database while the mobile device is in an offline mode;
assigning the data subject to modifications a draft state; and
reconciling, upon reconnection of the mobile database with the database management system, the data assigned the draft state and with data stored in the database management system.

17. A system comprising:
at least one processor; and,
at least one memory for storing computer program instructions, which, when processed by the at least one processor, cause the at least one processor to perform one or more operations, the one or more operations comprising:
receiving, from a mobile device, a request to transmit a subset of the data stored on a database associated with a database management system, the request including an indication of a user associated with the mobile device;
identifying, based on the indication of the user, a subset of the data contained within the database to store locally on the mobile device, the identifying including identifying a calculation scenario associated with the user, the calculation scenario usable by multiple different queries and which uses an index formed from logical metamodels that join tables to form the index;
performing, by the database management system and according to the calculation scenario, a set of queries on the database to generate the subset of the data stored on the database, the set of queries based on the indication of the user;
transmitting the subset of the data stored on the database to the mobile device for local storage on the mobile device to support database operations performed by the mobile device;
monitoring changes to the data, stored on the database, that corresponds with data stored locally on the mobile device; and
updating the mobile device with the changes to the data;
wherein the calculation scenario includes a directed acyclic graph including edges representing data flows and nodes representing operations, each node including a set of inputs and outputs and an operation that transforms the inputs into the outputs, wherein the inputs and outputs are user-defined table types that are passed into a procedure or function.

18. The system of claim 17, wherein the request further comprises an indication of the identity of the mobile device and the selecting of the subset of data is based on the identity of the mobile device.

19. The method of claim 18, wherein the indication of the identity of the mobile device facilitates determination of one or more characteristics of the mobile device.

20. The method of claim 17, wherein the set of queries are based on characteristics of the mobile device.

21. The system of claim 17, wherein the operations further comprise, at least:
monitoring requests, received from the mobile device, for data stored in the database.

22. The system of claim 17, wherein the operations further comprise, at least:
- receiving data use information associated with the user's interaction with the data stored locally on the mobile device and stored in the database;
- selecting data, from the database, to augment the data locally stored on the mobile device based on the user's use of the data stored locally on the mobile device and stored in the database; and,
- transmit the selected data to the mobile device associated with the user for storing locally on the mobile device.

23. The system of claim 17, wherein the operations further comprise, at least:
- receiving an input from a user indicating a user identity, the user having privileges to access data stored in a database;
- transmitting a request to the database management system, the request including a request for data to store locally on the mobile device and an indication of the user's identity; and,
- receiving, from the database management system, a subset of the data stored on a database associated with the database management system, for storing locally on the mobile device to facilitate performance, by the mobile device, of database operations.

* * * * *